US005635121A

United States Patent [19]

Huntt

[11] Patent Number: 5,635,121

[45] Date of Patent: Jun. 3, 1997

[54] APPARATUS AND PROCESS FOR FILING CERAMICS

[75] Inventor: Robert L. Huntt, Germantown, Md.

[73] Assignee: Alpha Industries, Woburn, Mass.

[21] Appl. No.: 399,957

[22] Filed: Mar. 6, 1995

Related U.S. Application Data

[63] Continuation of Ser. No. 13,472, Jan. 29, 1993, abandoned, which is a continuation of Ser. No. 745,973, Aug. 12, 1991, abandoned, which is a continuation of Ser. No. 304,293, Jan. 31, 1989, abandoned, which is a division of Ser. No. 149,174, Jan. 27, 1988, Pat. No. 4,833,302.

[51] Int. Cl.$^6$ .............................. C04B 33/32; C04B 38/06

[52] U.S. Cl. ............................ 264/648; 264/344; 264/656

[58] Field of Search ................................ 264/63, 65, 344

[56] References Cited

U.S. PATENT DOCUMENTS

| | | | |
|---|---|---|---|
| 2,799,912 | 7/1957 | Gregor | 264/63 |
| 2,956,024 | 10/1960 | Maxson | 264/63 |
| 2,960,744 | 11/1960 | Blank | 264/65 |
| 3,027,327 | 3/1962 | Blank | 264/65 |
| 3,853,973 | 12/1974 | Härdtl | 264/65 |
| 4,726,921 | 2/1988 | Nishigaki | 264/63 |
| 5,039,464 | 8/1991 | Wank | 264/65 |

*Primary Examiner*—James Derrington

*Attorney, Agent, or Firm*—Nikaido, Marmelstein, Murray & Oram LLP

[57] ABSTRACT

Making denser ceramic sinters by carrying out the sintering operation at elevated temperatures and in 100% oxygen at a pressure of at least 1.5 atmospheres, and then cooling the sinter without control of the ambient atmosphere. The product has a bulk density of at least 98% of the theoretical density of the sinter.

13 Claims, 4 Drawing Sheets

FIG. 2
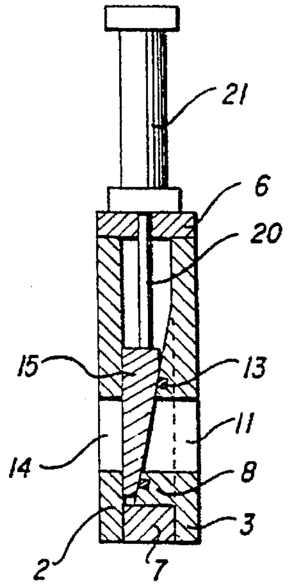
FIG. 3
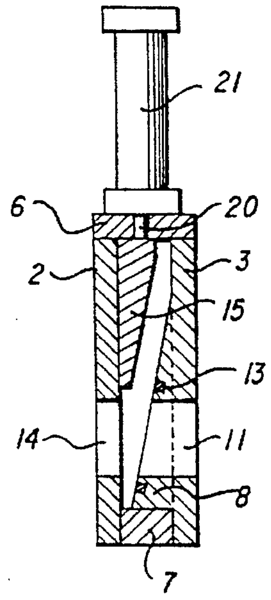
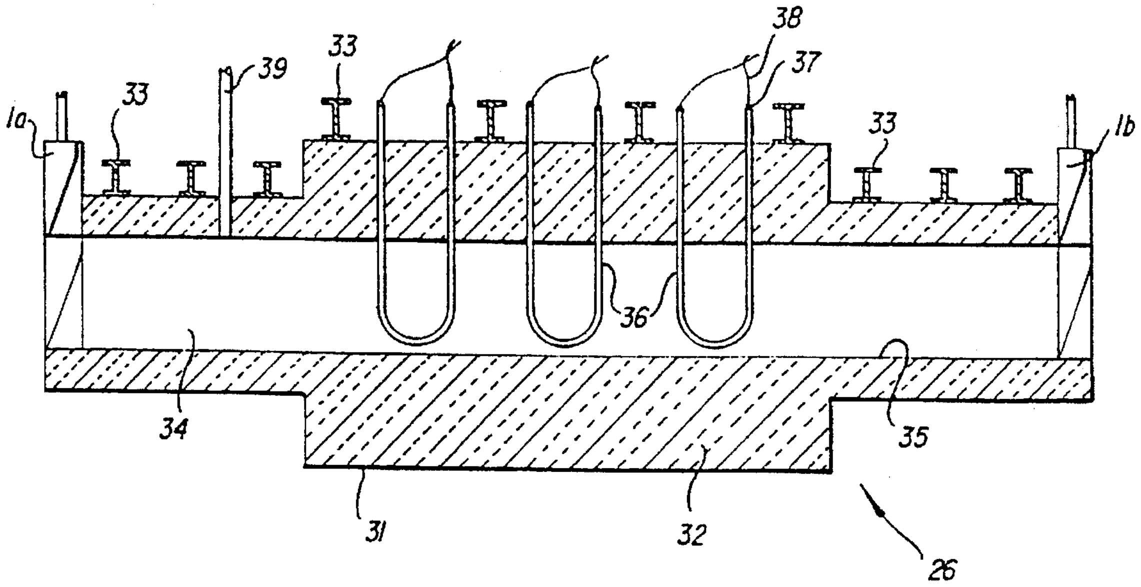
FIG. 5

APPARATUS AND PROCESS FOR FILING CERAMICS

This application is a continuation-in-part of application Ser. No. 08/013,472 filed Jan. 29, 1993 now abandoned, which is a division of application Ser. No. 149,174 filed Jan. 27, 1988, now U.S. Pat. No. 4,533,302, is a continuation of application Ser. No. 304,293 filed Jan. 31, 1989, now abandoned which is a continuation, now abandoned division of application Ser. No. 07/745,973, filed Aug. 12, 1991.

FIELD OF THE INVENTION

The present invention is directed to an oven for the continuous firing of ceramic materials having a binder therein, to a door assembly which can be utilized in such oven, and to a process for firing ceramic materials to produce a densed fired ceramic product, wherein the product has a density of at least 98% of the theoretical density.

BACKGROUND OF THE INVENTION

Many different types of vacuum and pressure furnaces or ovens have been utilized by the prior art. Westeren U.S. Pat. No. 3,431,346 discloses a vacuum furnace having opposed vestibule areas communicating with a heating chamber through a transfer zone. The vestibule areas are sealed off from the heating chamber by a sealing plate which is secured to a transfer assembly, and positionable to seal off either selected vestibule area. By using the opposed vestibule areas, a part exposed to a heating cycle may be transferred to the vestibule areas for cooling without changing the operating conditions within the heating chamber.

Crain et al U.S. Pat. No. 4,460,821 discloses an infrared furnace usable for firing electronic components in a non-reactive atmosphere. A product conveyor traverses the furnace, with baffle chambers surrounding the entrance and exit of the conveyor to the furnace. A seal chamber is disposed between each baffle chamber and firing chamber, with gas, such as nitrogen, under a super atmospheric pressure introduced into the baffle chambers and the seal chamber.

Pepe U.S. Pat. No. 4,285,668 discloses heat treatment conveyor tunnel furnaces designed to be constructed air-tight. Gas seals are formed at each end of the conveyor tunnel furnace, with gas supplied to the gas seal chamber at a pressure greater than atmospheric and greater than the gas pressure in the heating tunnel of the furnace. This difference in gas pressure prevents air from entering the furnace, and prevents any possible toxic gases in the furnace from leaking out to the atmosphere.

Bornor U.S. Pat. No. 3,447,788 is directed to an apparatus and method for heating workpieces in a furnace chamber, and then cooling the workpieces in a quenching chamber. The workpieces are introduced into the furnace chamber through a loading chamber, and are transferred from the furnace chamber to the quenching chamber through the same loading chamber. The loading chamber isolates the furnace chamber from the quenching chamber, and can be purged of oxygen and vapors from the quenching chamber during such time as it is necessary to open the furnace chamber to introduce and transfer workpieces. The admission of an oxidizing atmosphere to the furnace chamber is thus precluded, so that continuous heating of the furnace chamber may be conducted without danger of contamination.

Cope U.S. Pat. No. 2,602,653 discloses apparatus for continuously bright annealing light gauge stainless steel strips and the like. The apparatus includes a horizontal, externally heated muffle type furnace having a heating chamber therein, with baffles located at either end of the heating chamber, a cooled entry chamber ahead of the baffle at the entrance of the heating chamber, and a cooled exit chamber beyond the baffles at the exit end of the heating chamber. The strip to be annealed is continuously passed into and through the entry chamber, the heating chamber, and the cooling exit chamber. Door plates, having narrow slots through which the strip being treated may pass, are located at the entrance end of the entry chamber. The entrance chamber, the heating chamber, and the exit chamber are maintained completely filled with a special atmosphere, such as dissociated ammonia gas, which is continuously supplied under pressure.

The Bielefeldt U.S. Pat. No. 3,609,295 discloses heating apparatus for heating workpieces such as aluminum parts which are brazed together during the heating operation. Heating of the parts is conducted in the presence of a vacuum, and gas-tight doors are guided for horizontal sliding along respective tracks to separate the heating vessel from a loading vessel and an unloading vessel, and to separate the loading and unloading vessels from the atmosphere.

Barnebey U.S. Pat. No. 1,778,747 discloses a tunnel kiln for manufacturing activated charcoal. A vestibule having an inner door and an outer door is provided at each end of the tunnel kiln. The inner door moves vertically in guideways which are made gas-tight by suitable metal casings. The outer door is similarly constructed, and in order to secure a gas-tight closure for the outer door, to prevent gases from escaping or entering the tunnel kilns, a pair of wedges are arranged at the side of the door, and another pair at the lower corners. The guideways are provided with inclined abuttments for receiving these wedges, so that when the door is lowered it automatically fits itself securely against the framework.

Johansson U.S. Pat. No. 3,852,026 discloses a method for heating or heat treating material in a furnace. Goods are introduced to and removed from the furnace through lock-type feed valves provided with feed valve flaps. These flaps pivot at the upper edge thereof to permit the flaps to be swung from a closing and sealing position to an open position. A protective gas is passed to the furnace during the heating steps, and the pressure in the furnace may be maintained at a desired, substantially constant level, for instance at a gauge pressure of approximately 10 mm of water.

Crain U.S. Pat. No. 4,517,448 discloses an infrared furnace having a controlled atmosphere. The atmosphere may be nitrogen or oxygen, which is fed into the furnace under low pressure, so that the interior of the heating chamber is at a slightly higher pressure than the atmosphere surrounding the furnace. Baffle units are provided at the entrance and exit ends of the heating chamber, and utilize a series of traversely disposed baffle walls.

Other oven or kiln constructions which appear to be less relevant are described in the following U.S. Pat. Nos.:

| Patent No. | Name | Date |
|---|---|---|
| 1,253,487 | J. L. Harper | Jan. 15, 1918 |
| 1,451,815 | R. W. Davenport | Apr. 11, 1923 |
| 3,119,166 | L. Ostermaier | Jan. 28, 1964 |
| 2,992,286 | N. W. Smit et al | July 11, 1961 |

-continued

| Patent No. | Name | Date |
|---|---|---|
| 1,643,775 | J. Kelleher | Sept 27, 1927 |
| 2,237,966 | R. P. Koehring | Apr. 8, 1941 |

DeCoriolis U.S. Pat. No. 2,033,331 discloses a heat treating furnace having a charging chamber, a discharge chamber and a middle chamber or muffle therebetween. The chambers are separated by valves. The valves include a pair of opposed flat valve seats which extend upwardly and diverging relation, and cooperate with a pair of flat valve plates which are hinged back-to-back and separately movable. Force exerted downwardly on the hinge of the valve plates wedges the plates to the valve seats.

Early U.S. Pat. No. 4,429,641 discloses a ceramic hearth door and frame, with the door slidably disposed within the frame. The back wall of the frame is tapered slightly to permit the door to lay back against the back wall for sealing engagement between the door and the recessed portion of the frame. The bottom of the door is also tapered to force the back of the door against the back of the recessed portion of the frame.

Turecek U.S. Pat. No. 4,503,784 discloses a door for an incinerator or cremator wherein a wedge-shaped opening in the incinerator or cremator is provided. The opening is wider at the top than the bottom, and tapers from the top to the bottom by straight side wall faces. The opening is of wedge-shape trapezoidal shape, and the incinerator door is of a complimentary wedge shape to the opening. The door carries a seal around its periphery, and the seal, when the door is closed, is compressed between the door and the sides and bottom of the opening. When the door is lowered in complete engagement with the opening with compression of the seal is such that the closure is rendered substantially air-tight.

SUMMARY OF THE INVENTION

The present invention is directed to an oven for the continuous firing of bindered ceramic material. The oven system includes a burnout oven and a firing oven, connected by a conveyor for conveying the ceramic materials through the burnout oven and the firing oven. In the burnout oven the binder is burned out of the ceramic material without substantial firing of the ceramic material, and the firing of the ceramic materials is accomplished in the firing oven at an elevated firing temperature in an oxygen atmosphere of at least one-half atmosphere gauge. The resulting fired ceramic products are at least substantially in the oxide form, and have a density of at least 98% of the theoretical density.

Another aspect of the present invention is the door assembly which may be used in the firing oven. The door involves a resilient seal and certain wedge-shaped surfaces which cause the door to assume a closed position which firmly seals the door against the resilient seal so that gases cannot escape through the closed door. When the door is open, material can pass freely through the door opening.

A further aspect of the present invention is a process for firing ceramic materials to produce high density ceramic products. The ceramic materials are bindered ceramic materials, and these materials are first heated in a burnout oven for a time and temperature sufficient to at least substantially remove the binder from the ceramic materials without firing the ceramic materials. Thereafter the ceramic materials are fired in a closed kiln at a temperature of 800° to 1600° C. in an oxygen atmosphere of at least one-half atmosphere gauge, with firing being conducted for a time sufficient for the ceramic materials to react and form dense ceramic oxide products having a density of at least 98% of the theoretical density.

BRIEF DESCRIPTION OF THE DRAWINGS

The invention will be understood more readily with reference to the accompanying drawings, wherein

FIG. 2 is a view partly in cross-section of the door of FIG. 1, shown assembled and in closed position;

FIG. 3 is the same view as FIG. 2, but with the door shown in the open position;

FIG. 5 is a view partly in cross-section of the firing oven of the present invention;

DETAILED DESCRIPTION OF THE INVENTION

Figure 1:
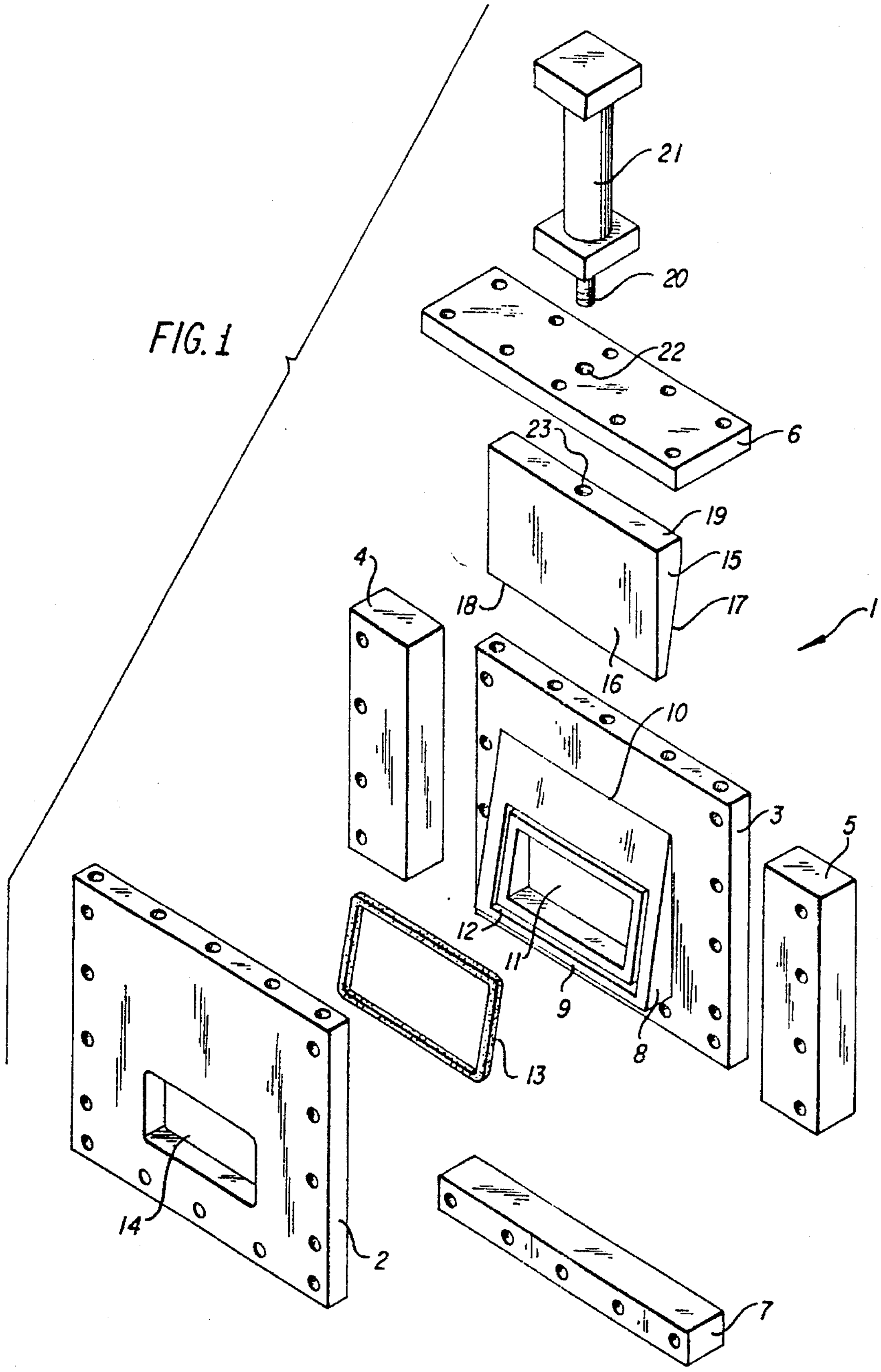
FIG. 1 is an exploded view of the oven door of the present invention.

In FIG. 1, door assembly 1 includes a frame and a door. The frame comprises a front portion 2, a back portion 3, side portions 4, 5, top portion 6, and bottom portion 7. The portions are held together by bolts (not shown). Ramp 8 is mounted on back portion 3, and has a uniform taper extending from a broader bottom 9 to a narrower top 10. Opening 11 passes through ramp 8 and back portion 3, and defines a path through which material can pass into or out of the oven, as described hereinafter. Groove 12 is located on ramp 8 and surrounds opening 11. Groove 12 receives and holds resilient seal 13, with the seal protruding slightly past the face of ramp 8. Seal 13 is preferably made of silicon rubber.

Opening 14 is located in front portion 2, and generally corresponds in size and relative location to opening 11, and also serves to permit entry or exit of products from the firing oven.

Door 15 has a flat vertical surface 16 and a flat inclined surface 17, making the door wedge-shaped and narrower at the bottom 18 than at the top 19. Thus in cross-section the door is wedge-shaped, with inclined surface 17 generally being at the same angle as the inclined surface of ramp 8. Rod 20 is connected to a piston (not shown) inside of cylinder 21 and operable by suitable fluid, either pneumatic or hydraulic. Rod 20 passes through port 22 in top portion 6, and is inserted into threaded hole 23 of door 15.

FIGS. 2 and 3 illustrate the door assembly in assembled form, with the front, back, side, top and bottom portions bolted to each other by bolts (not shown). The piston has been moved down cylinder 21, so that rod 20 is generally extended out of cylinder 21, causing door 15 to be at its lower point of travel. Because of the wedging action between door 15, front portion 2 and ramp 8, seal 13 is compressed between door 15 and ramp 8, thereby defining a gas-tight seal around opening 11. Opening 11 should open into the firing oven, wherein opening 14 opens to the atmosphere.

In FIG. 3, the piston has been moved up cylinder 21, drawing rod 20 into cylinder 21, and raising door 15 to an upper position. It will be noted that door 15 is raised so that it does not impede material passing through openings 11, 14, so that material can freely enter or leave the firing oven.

Figure 4:
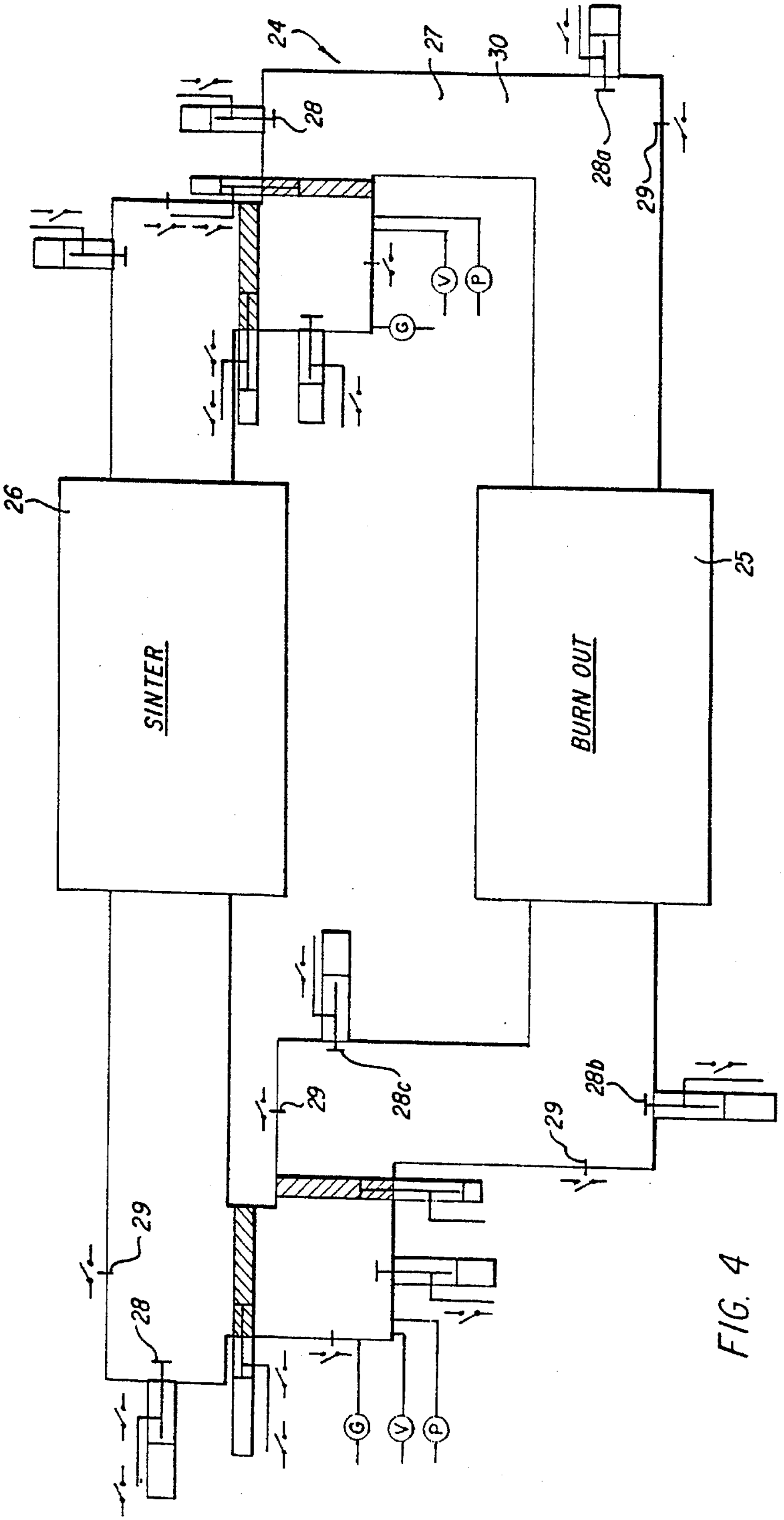
FIG. 4 is a schematic view of the oven apparatus of the present invention.

Referring to FIG. 4, oven assembly 24 includes a burnout oven 25 and a sintering or firing oven 26. Conveyor 27 forms a closed loop which passes through oven 25 and through oven 26. A plurality of push rods 28, in combination with pressure switches 29, move flat supports or trays (not shown), having ceramic material thereon, on the conveyor 27.

Thus operation of the oven assembly 24 will continually have a series of ceramic material moving stepwise through burnout oven 25 and firing oven 26. The fired product is removed from the conveyor, and fresh ceramic material placed on the conveyor, in area 30 of conveyor 27. The push rods 28, which operate to advance a support or tray one support or tray length, are operated by a microprocessor-controlled central unit, with pressure switches 29 feeding information to the central unit, to alert the central unit that a support or tray is in proper position for activation of a given push rod. In the arrangement shown in FIG. 4, the push rods would operate sequentially in a counter clockwise direction to move the supports or trays around the conveyor in a clockwise direction. For instance, push rod **28*a* would operate, then push rod 28*b* would operate, then push rod 28*c*** would operate, and so forth.

Firing oven 26 is illustrated in greater detail in FIG. 5. A door assembly 1 is located at each end of oven 26. The oven includes a steel shell 31 and insulation 32. Surrounding steel shell 31 are reinforcing I beams 33. Passageway 34 extends through oven 26, from entry door assembly **1*a* to exit door assembly 1*b*, with the lower surface 35 of passageway 34 extending in a flat plane between the doors, permitting unimpeded travel of supports or trays having ceramic material thereon through oven 26. Electrical heating elements 36 are generally U-shaped, and extend well down into cavity 34. It is important that heating elements 36 have a junction 37 to electrical wires 38 which lies outside of element 26, as otherwise junction 37** will be subjected to higher temperatures and a more corrosive atmosphere, resulting in shorter lifespan.

Oxygen from a suitable source (not shown) is introduced into cavity 34 through supply pipe 39, with the oxygen being regulated by a pressure regulator (not shown) to keep a predetermined oxygen pressure inside of oven 26.

The steel shell 31 surrounding oven 26 preferably has a thickness of ½ inch on the bottom and ¼ inch on the sides and top. In a preferred embodiment the oven has 10 ½ inches of insulation on each side and on the top and bottom. The interior of the oven is preferably lined with 4 ½ inches of k-3000 brick, then 2 ½ inches of 2600 brick, followed by 2 ½ inches of k-2300 brick. The outside of the oven (before the steel shell) preferably has 1 inch of fiber-frax soft insulation board.

It is important that the burnout oven be separate from the firing oven, so as to prevent organic materials produced from burning of the binder in the burnout oven from getting into the firing oven. Furthermore, the firing oven requires relatively cool ends in order to prevent the doors from becoming too hot, and destroying the resilient seal. If the burnout oven and firing oven were back-to-back, the door therebetween would tend to become hotter than in the arrangement illustrated in FIG. 4. Furthermore, if vacuum were applied to an adjacent burnout oven, the firing oven could encounter problems regarding the pressurized atmosphere therein, since the vacuum in the burnout section would tend to evacuate too much oxygen from the firing oven.

Figure 6:
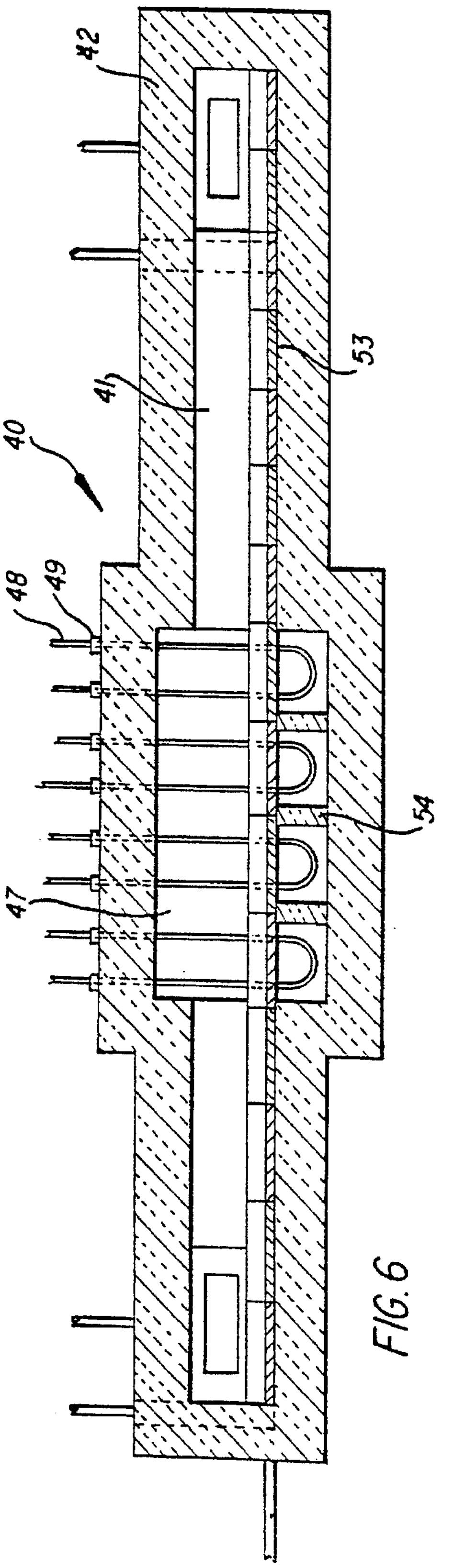
FIG. 6 is a cross-sectional view of a preferred embodiment of the firing oven of the present invention.
Figure 7:
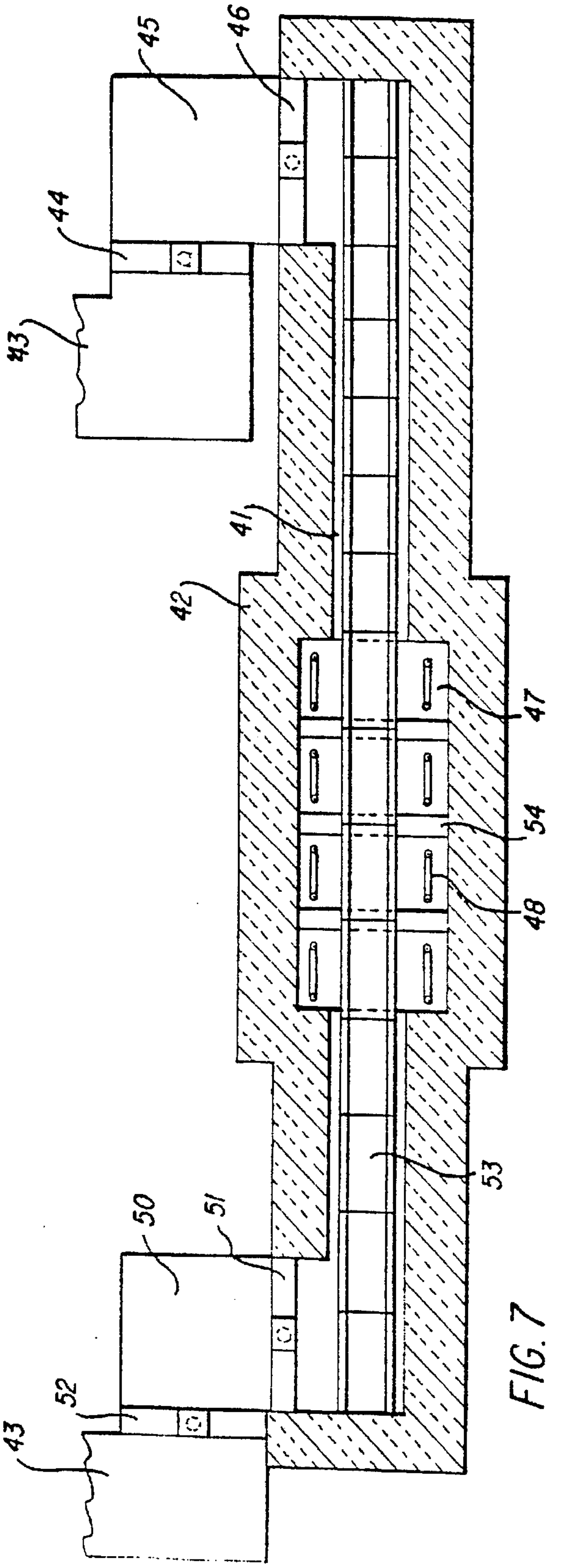
FIG. 7 is a top view partly in cross-section of the firing oven of FIG. 6.

In FIGS. 6 and 7, firing oven 40 has a cavity 41 surrounded by insulation 42. Conveyor 43, similar to conveyor 27 of FIG. 4, conveys material through first entrance door 44 into entrance vestibule 45, and then through second entrance door 46 into cavity 41. Firing oven 40 includes a central enlarged area 47 in which are located heating bars 48 associated with seals 49 at the location wherein heating bars 48 pass through the roof of oven 40.

Exit vestibule 50 is associated with first exit door 51 and second exit door 52, with second exit door 52 leading to conveyor 43.

Heating rods 48 are preferably of molydenium disilicide, and seals 49 are preferably high temperature silicon rubber seals.

Firing oven 40 will normally have reinforcing steel I-beams surrounding the oven, similar to beams 33 of FIG. 5.

A plurality of ceramic plates 53 are located on the bottom of cavity 41, and in enlarged area 47 are supported by a plurality of hearth arcs 54. This permits the high temperature oven gas to circulate freely around the ceramic plates 53, and ceramic material to be fired located thereon, in the area of enlarged area 47.

Each of doors 44, 46, 51 and 52 are associated with pressure switches (not shown) and push rods (not shown), similar to the pressure switches and push rods of FIG. 4, for the conveyance of material on the conveyor, including through entrance vestibule 45, oven cavity 41, and exit vestibule 50. For simplicity, second entrance door 46 and first exit door 51 are illustrated in FIG. 6 in the open position.

Ceramic materials are fired in the firing oven of FIGS. 6 and 7 at a temperature of 800° to 1600° C., and preferably at a temperature of 1300° to 1500° C. The ceramic materials which are fired in firing oven 40 can be, for instance, the ceramic materials disclosed in U.S. patent application Ser. No. 049,984 filed on May 15, 1987, the disclosure of which is hereby incorporated by reference for the teachings of such ceramic materials therein, or other, conventional ceramic materials well known to those in the art. The oxygen pressure within firing oven 40 is at least one-half atmosphere gauge, and preferably is about one atmosphere gauge. Higher oxygen pressures can be utilized if desired, but the higher pressures generally result in very high pressures being exerted upon the walls of firing oven 40, so that for practical reasons the oxygen pressure will rarely exceed two atmospheres gauge.

The resulting ceramic products have a fired density which is at least 98%, and preferably at least 99% of the theoretical density. After the firing step is completed, and the fired products are removed from firing oven 40, the products are normally allowed to cool in ambient air, and then removed from conveyor 43.

I claim:

1. A process for firing ceramic materials to produce fired ceramic products having a density of at least 98% of theoretical density, said process comprising introducing a shaped article comprising ceramic particles and binder therefor into a burnout oven and subjecting the shaped article in the burnout oven to a temperature of 700° to 1600° C. for a time sufficient to at least substantially remove said binder without firing the ceramic materials, and to create gaseous products of burning said binder and a substantially binder free shaped article comprising particles; separating said gaseous product from said binder free shaped article; thereafter firing the substantially binder free shaped article in a closed kiln, while at least substantially preventing gaseous products of burning the binder in the burnout oven from entering the kiln, said firing in said kiln being at a temperature of 800° to 1600° C. under an atmosphere, consisting essentially of oxygen at a pressure of at least one-half atmosphere gauge, for a time sufficient for said particles to sinter; and then normally allowing said fired shaped article to cool in ambient air; whereby to form ceramic, oxide products whose bulk density is at least about 98% of the theoretical density of said ceramic oxide shaped article.

2. A process for firing a shaped article comprising ceramic particles to produce a fired ceramic shaped article having a density of at least 98% of theoretical density, said process comprising firing the shaped article comprising ceramic particles at a temperature of 800° to 1600° C. in a closed kiln having an atmosphere consisting essentially of oxygen at a pressure of at least one-half atmosphere gauge, and wherein the firing is conducted for time sufficient for said ceramic particles to sinter and then normally allowing said sintered shaped article to cool in ambient air; whereby to form dense ceramic oxide shaped articles whose bulk density is at least about 98% of the theoretical density of said ceramic oxide shaped article.

3. A process as claimed in claim 1 carried out continuously in a tunnel furnace.

4. A process as claimed in claim 1 carried out under said atmosphere consisting essentially of oxygen having an overall pressure of up to about 2 atmospheres, gauge.

5. A process as claimed in claim 1 wherein said ceramic particles comprise particles which are not substantially adversely affected by contact with oxygen at elevated pressure and elevated temperature.

6. A process as claimed in claim 1 wherein said ceramic particles consist essentially of a composition which is not substantially adversely affected by contact with oxygen at elevated pressure and elevated temperature.

7. A process as claimed in claim 2 carried out continuously in a tunnel furnace.

8. A process as claimed in claim 2 carried out under said atmosphere consisting essentially of oxygen having an overall pressure of up to about 2 atmospheres, gauge.

9. A process as claimed in claim 2 wherein said ceramic particles comprise particles which are not substantially adversely affected by contact with oxygen at elevated pressure and elevated temperature.

10. A process as claimed in claim 2 wherein said ceramic particles consist essentially of a composition which is not substantially adversely affected by contact with oxygen at elevated pressure and elevated temperature.

11. In the process of forming a ceramic shaped article sinter comprising:

subjecting a shaped article, comprising particles of ceramic material and a binder therefore, to a temperature of 700° to 1600° C. in the burnout oven for a time sufficient to at least substantially remove said binder without firing the ceramic particles; and thereby creating gaseous products of burning said binder and a substantially binder free shaped article comprising particles;

separating said gaseous products of burning from said binder free shaped article;

thereafter firing the substantially binder free shaped article in a closed kiln, while preventing any substantial amount of gaseous products of burning the binder in the burnout oven from entering the kiln; and then cooling said fired shaped article to form a ceramic product article;

the improvement, of forming a ceramic article of high bulk density of at least 98% of the theoretical density of said sinter components, which comprises:

firing said substantially binder free article in said kiln at a temperature of 800° to 1600° C. under an atmosphere consisting essentially of oxygen at a pressure of at least one-half atmosphere gauge, for a time sufficient for said particles to sinter; and then allowing said fired shaped article to cool under ambient air;

whereby forming a ceramic, oxide product whose bulk density is at least about 98% of the theoretical density of the components of said ceramic oxide shaped article.

12. In the process of forming a ceramic shaped article sinter comprising:

firing a shaped article comprising ceramic particles at a temperature of 800° to 1600° C. in a closed kiln having an atmosphere comprising oxygen to form a ceramic oxide shaped article; and then cooling said ceramic oxide shaped article to form a ceramic article product;

the improvement, of forming a ceramic article of high bulk density of at least 98% of the theoretical density of said sinter components, which comprises:

firing said substantially ceramic article in said kiln at a temperature of 800° to 1600° C. under an atmosphere consisting essentially of oxygen at a pressure of at least one-half atmosphere gauge, for a time sufficient for said particles to sinter; and then allowing said fired shaped article to cool under ambient air;

whereby forming a ceramic, oxide product whose bulk density is at least about 98% of the theoretical density of the components of said ceramic oxide shaped article.

13. A process of increasing the bulk density of a sintered ceramic article which comprises:

forming a shaped article of ceramic particles;

sintering said shaped article at a temperature of about 800° to 1600° C. under an atmosphere consisting essentially of oxygen at a pressure of at least one-half atmosphere gauge, for a time sufficient to sinter said particles into a ceramic oxide shaped article having a bulk density of at least about 98% of the theoretical density of the components of said ceramic oxide shaped article; and then allowing said sintered ceramic oxide shaped article to cool in ambient air.

* * * * *